United States Patent [19]
Levine et al.

[11] Patent Number: 6,020,973
[45] Date of Patent: Feb. 1, 2000

[54] CENTRALIZED PRINT SERVER FOR INTERFACING ONE OR MORE NETWORK CLIENTS WITH A PLURALITY OF PRINTING DEVICES

[75] Inventors: Jonathan D. Levine; Barry G. Gombert; James L. Mayer, all of Rochester, N.Y.

[73] Assignee: Xerox Corporation, Stamford, Conn.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/842,584

[22] Filed: Apr. 15, 1997

[51] Int. Cl.[7] .................................................. G06F 15/00
[52] U.S. Cl. .......................................................... 358/1.15
[58] Field of Search ..................................... 395/113, 114; 709/300, 301, 302, 226, 104; 358/1.14, 1.15

[56] References Cited

U.S. PATENT DOCUMENTS

| | | | |
|---|---|---|---|
| 5,113,494 | 5/1992 | Menendez et al. | 395/163 |
| 5,179,637 | 1/1993 | Nardozzi | 395/114 |
| 5,220,674 | 6/1993 | Morgan et al. | 395/800 |
| 5,457,797 | 10/1995 | Butterworth et al. | 395/650 |
| 5,625,757 | 4/1997 | Kageyama et al. | 395/113 |
| 5,719,941 | 2/1998 | Swift et al. | 395/491 |
| 5,781,711 | 7/1998 | Austin et al. | 395/114 |
| 5,784,622 | 7/1998 | Kalwitz et al. | 395/726 |
| 5,881,213 | 3/1999 | Shaw et al. | 395/114 |

*Primary Examiner*—Andrew W. Johns
*Attorney, Agent, or Firm*—G. B. Cohen; R. Hutter

[57] ABSTRACT

A method for use with a printing system of a type in which one or more clients communicate with a plurality of printers by way of a network and print server is provided. The print server includes a communications layer with a plurality of connectivity modules, and each of the connectivity modules communicates with at least one of the plurality of printers. The method includes the steps of generating a document processing function call in the print server, in response to a request from one of the one or more clients, and selecting one of the plurality of connectivity modules. In turn, the document processing function call is transmitted to the selected one of the plurality of connectivity modules; and, in response to analyzing the document processing function call with the communications interface, a set of information is obtained with the selected connectivity module. The set of information is transferred between the selected one of the plurality of connectivity modules and the one of the plurality of printers to perform an operation with or obtain a set of information from the one of the plurality of printers.

7 Claims, 6 Drawing Sheets

CENTRALIZED PRINT SERVER FOR INTERFACING ONE OR MORE NETWORK CLIENTS WITH A PLURALITY OF PRINTING DEVICES

BACKGROUND

The present application is related in subject matter to and cross referenced with co-pending U.S. patent application Ser. No. 08/842,546, filed Apr. 15, 1997.

This invention relates generally to a printing system in which one or more clients communicate with a plurality of printers by way of a print server and, more particularly, to an approach in which a document processing function call is generated, in response to a request from one of the one or more clients, and the function call is used by a communcations interface, disposed in the print server, for performing an operation with or obtaining a set of information from one of the plurality of printers.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the printing system from, among other sources, a network or a scanner. An example of a printing system with both network and scanner inputs is found in the following patent:

U.S. Pat. No. 5,170,340

Patentees: Prokop et al.

Issued: Dec. 8, 1992

When a scanner is employed to generate the job, image bearing ocuments are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory". An example of electronic precollation memory may be found in the following patent:

U.S. Pat. No. 5,047,955

Patentees: Shope et al.

Issued: Sep. 10,1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality" continues to grow. As illustrated by the following patent, a multifunctional digital copier can assume the form of an arrangement in which a single electrostatic processing printer is coupled with a plurality of different image input devices, with such devices being adapted to produce image related information for use by the printer.

U.S. Pat. No. 3,957,071

Patentee: Jones

Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:

U.S. Pat. No. 4,821,107

Patentees: Naito et al.

Issued: Apr. 11, 1989

U.S. Pat. No. 5,021,892

Patentees: Kita et al.

Issued: Jun. 4, 1991

U.S. Pat. No. 5,175,633

Patentees: Saito et al.

Issued: Dec. 29, 1992

U.S. Pat. No. 5,223,948

Patentees: Sakurai et al.

Issued: Jun. 29, 1993

U.S. Pat. No. 5,276,799

Patentee: Rivshin

Issued: Jan. 4, 1994

U.S. Pat. No. 5,307,458

Patentees: Freiburg et al.

Issued: Apr. 26, 1994

Multifunctional copying devices are typically adapted to store a plurality of jobs for eventual printing. In one example, jobs are ordered for printing in an arrangement referred to as a "print queue". Xerox Network Systems have employed the concept of the print queue for at least a decade to manage jobs at network printers. Further teaching regarding network printing is provided in the following patent:

U.S. Pat. No. 5,436,730

Patentee: Hube

Issued: Jul. 25, 1995

The concept of a print queue is integral to operation of Xerox' DocuTech Printing System as exemplified in the following patent:

U.S. Pat. No. 5,164,842

Patentees: Gauronski et al.

Issued: Nov. 17, 1992

A print queue particularly well suited for use with a multifunctional printing system is disclosed by the following patent:

U.S. Pat. No. 4,947,345

Patentees: Paradise et al.

Issued: Aug. 7, 1990

It has been found that a typical digital copier is particularly well suited for use with a network printing arrangement in which the digital copier is interfaced with a client (e.g. workstation) by way of a suitable network connection and a print server. The following patents represent examples of servers suitable for use with printing systems:

U.S. Pat. No. 5,113,494

Patentees: Menendez et al.

Issued: May 12, 1992

U.S. Pat. No. 5,179,637

Patentee: Nardozzi

Issued: Jan. 12, 1993

U.S. Pat. No. 5,220,674

Patentees: Morgan et al.

Issued: Jun. 15, 1993

U.S. Pat. No. 5,113,494 discloses an arrangement in which a plurality of nodes communicate with one another by way of a local area network communication line. In one example, a hardcopy of a job could be processed at a scan node while an electronic copy of the same job could be processed at a print node.

U.S. Pat. No. 5,179,637 discloses a system for distributing print jobs received from a print image data source among a set of print engines and associated processors. One or more data files containing the information required to print one or more copies of an image are submitted to a scheduler and the scheduler interprets the job control information in the data file(s) for the image and passes the data files(s) to an image processor.

U.S. Pat. No. 5,220,674 discloses a local area print server which functions in cooperation with a plurality of clients and a plurality of printers to facilitate communication between the clients and the printers. The server includes various subsystems, such as a status collection subsystem that maintains a wide range of state information regarding virtually every subsystem with which the server communicates. The status collection subsystem includes a notification facility which sends reports of printing system status changes or events to appropriate network components internal and external to the local area print server that would have an interest in knowing them.

Further detailed description of the network printing area is provided in U.S. Pat. No. 5,551,686 to Sanchez et al.

On the increasingly popular world-wide-web (www), hypertext markup language (html) specifies the display of information on a "client" computer, and hypertext transfer protocol (http) provides a neutral mechanism for the transfer of information from a "server" computer to a "client" computer over the TCP/IP network protocol. Of particular interest is the neutral aspect, in which the transfer and display of information does not depend on the client computers operating system or processor configuration, but only on the capabilities of a protocol-compliant "browser". Such software is widely available for most computers at this time. Information transferred and displayed to the client includes both static information defined in advance and dynamic information computed at the time that a client makes a request to the server. Publicly available server software often includes the common gateway interface (CGI) which allows the server to invoke a software program which may be passed user specified parameters, and whose output will be transferred to, and displayed on the client computer.

Print and document processing machines can use html and http as interfaces for control and status. These machines benefit greatly from such use for several reasons: First, development costs are lower and deployment schedules shorter since the mechanism can be used by many clients without the necessity of writing the client display software (often referred to as "user interface" or UI) for each operating system and processor that clients use. Second, it is straightforward to define multi-lingual interfaces by storing the information in multiple languages on the server, permitting the server to be accessed in multiple languages by different clients concurrently. Third, upgrades or changes can be made to the print or document processing machine's capabilities without the inconvenience of the vendor developing new client display software and of the client having to install new software on every client computer for each such upgrade.

In a network printing system, such as that disclosed by U.S. Pat. No. 5,220,674, a significant number of operation requests (e.g. queries) are passed between a given client and one or more printing subsystems to determine selected information regarding a given printing subsystem, such as machine settings for or status of the given printing subsystem. These queries are best handled in an HTTP context since such context tends to be neutral across document processing platforms of varying specifications. It is believed, however, that this advantage of neutrality has not been fully exploited in the art. For instance, Hewlett-Packard ("HP") is believed to provide an arrangement in which a plurality of clients communicates with a plurality of document processing devices by way of a server. In order to use the server with the devices, however, it is necessary that the devices include a special card which is proprietary to HP. It would be desirable to provide a proxy server which is capable of performing a host of Internet operations among document processing devices some of which include embedded HTTP servers and others of which do not include embedded HTTP servers.

Additionally, in a typical proxy server an application layer communicates with a connectivity layer which permits the operation requests to be transferred between the clients and the document processing devices. Some client/server based software accommodates for the connectivity layer through an interface referred to as Middleware. In operation, Middleware includes a plurality of modules, each of which modules facilitates the transfer of operation requests between the clients and one or more target devices. For example, one module may facilitate the transfer of a query between a Microsoft based client and a Document Centre based printer ("Document Centre" is a trademark of Xerox Corp.). In one prior art scheme, a request for an operation is received from the client, via the application layer, and a set of parameters corresponding with the request is created by the application layer. In one instance, the request may seek to ascertain the values associated with selected machine settings of the target document processing device. Accordingly, the requested settings are communicated to the connectivity layer and it, in turn, obtains the values designated by the application layer.

This approach of using the application layer to set the parameter creates difficulties for the drafter of application code in that s/he may not be the one most familiar with the current parameters with which the corresponding target is associated. On the other hand, typically, those writing code for the connectivity layer are quite familiar with the current parameters with which target document processing devices are associated. Thus, it would be desirable to provide a system in which the responsibility of obtaining values associated with a given document processing device is shifted from the application layer to the connectivity or Middleware layer.

SUMMARY OF THE INVENTION

In accordance with the disclosed invention, there is provided a method for use with a printing system of a type in which one or more clients communicate with a plurality of printers by way of a network and print server, the print server including a communications layer with a plurality of connectivity modules, wherein each of the connectivity modules communicates with at least one of the plurality of printers, comprising: a) in response to a request from one of the one or more clients, to perform an operation relative to or obtain a set of information from one of the plurality of printers, generating a document processing function call in the print server; b) selecting one of the plurality of connectivity modules, the selected connectivity module being corresponded with both the one of the one or more clients and the one of the plurality of printers; c) transmitting the document processing function call to the selected one of the plurality of connectivity modules; d) in response to analyzing the document processing function call with the communications interface, obtaining a set of information, with the selected connectivity module, for transfer to the one of the plurality of printers; and e) transferring the set of information between the selected one of the plurality of connectivity modules and the one of the plurality of printers to perform the operation or obtain the information designated by the request.

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
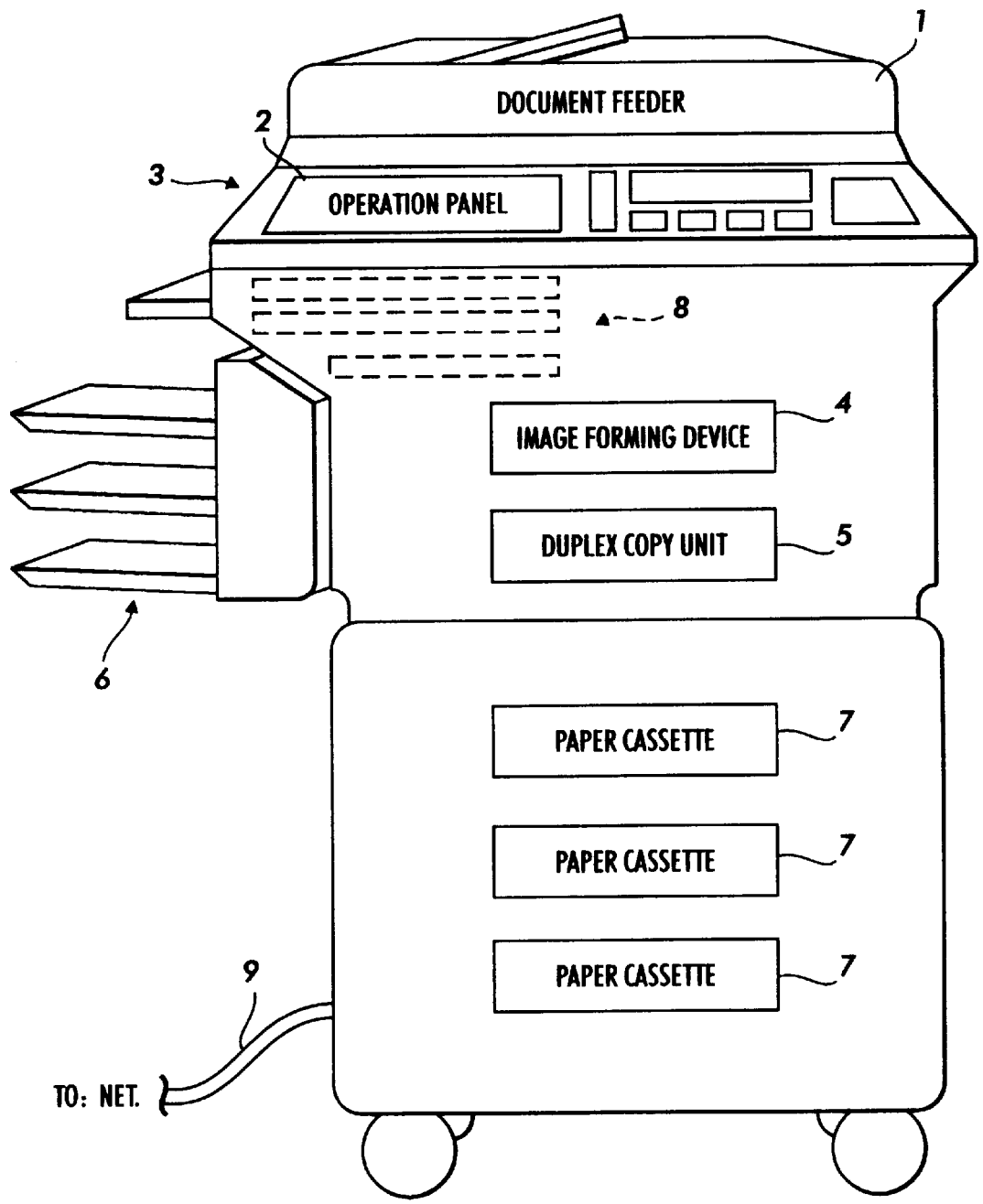
FIG. 1 is a perspective view of a networked digital copier suitable for responding to information requests.

Referring to FIG. 1 of the drawings, a digital copier system of the type suitable for use with the preferred embodiment is shown. As shown, the system includes a document feeder 1 and an operation (and display) panel 2. After desired conditions have been entered on the operation panel 2, the document feeder 1 conveys a document to a predetermined reading position on an image reading device 3 and, after the document has been read, drives it away from the reading position. The image reading device 3 illuminates the document brought to the reading position thereof. The resulting reflection from the document is transformed to a corresponding electric signal, or image signal, by a solid state imaging device, e.g., a CCD (Charge Coupled Device) image sensor. An image forming device 4 forms an image represented by the image signal on a plain paper or a thermosensitive paper by an electrophotographic, thermosensitive, heat transfer, ink jet or similar conventional system.

As a paper is fed from any one of paper cassettes 7 to the image on forming device 4, the device 4 forms an image on one side of the paper. A duplex copy unit 5 is constructed to turn over the paper carrying the image on one side thereof and again feed it to the image forming device 4. As a result, an image is formed on the other side of the paper to complete a duplex copy. The duplex copy unit 5 has customarily been designed to refeed the paper immediately or to sequentially refeed a plurality of papers stacked one upon the other, from the bottom paper to the top paper. The papers, or duplex copies, driven out of the image forming device 4 are sequentially sorted by a output device 6 in order of page or page by page.

Applications, generally 8, share the document feeder 1, operation panel 2, image reading device 3, image forming device 4, duplex unit 5, output device 6, and paper cassettes 7 which are the resources built in the copier system. As will appear, the applications include a copier application, a printer (IOT) application, a facsimile (Fax) application and other applications. Additionally, the digital copier system is coupled with a network by way of a conventional network connection 9.

Figure 2:
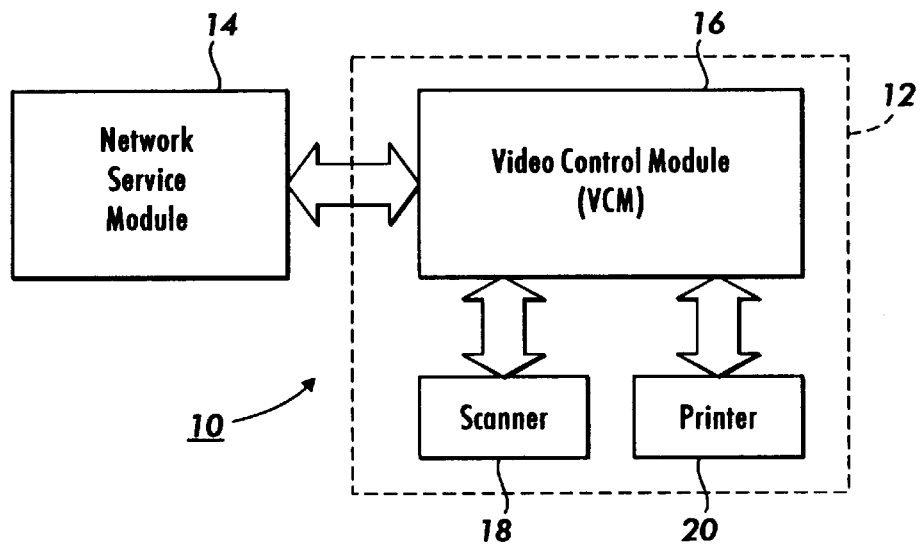
FIG. 2 is a block diagram depicting a multifunctional, network adaptive printing machine.

Referring to FIG. 2, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which is described in detail in U.S. Pat. No. 5,579,447 to Salgado, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system (not shown), associated with the scanner 18, executes signal correction and the like, converts the corrected signals into multi-level signals (e.g. binary signals), compresses the multi-level signals and preferably stores the same in electronic precollation (not shown).

Referring to FIG. 2, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory, while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 3:
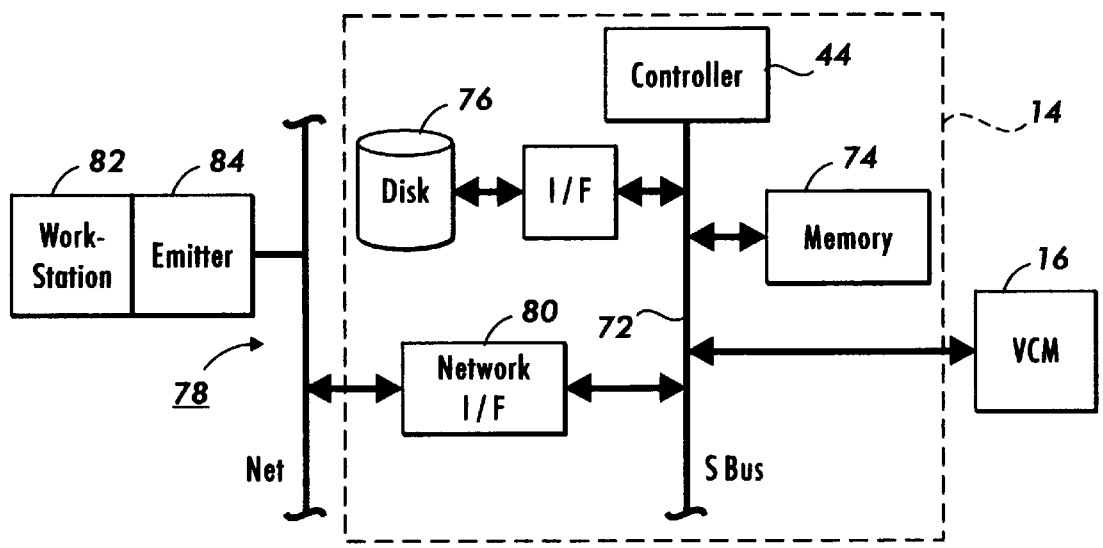
FIG. 3 is a block diagram of a network controller for the printing machine of FIG. 2.

Referring to FIG. 3, the network service module 14 is discussed in further detail. As will be recognized by those skilled in the art, the architecture of the network service module is similar to that of a known "PC clone". More particularly, in one example, a controller 44 assumes the form of a SPARC processor, manufactured by Sun Microsystems, Inc., is coupled with a standard SBus 72. In the illustrated embodiment of FIG. 3, a host memory 74, which preferably assumes the form of DRAM, and a SCSI disk drive device 76 are coupled operatively to the SBus 72. While not shown in FIG. 3, a storage or I/O device could be coupled with the SBus with a suitable interface chip. As further shown in FIG. 3, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. Pat. No. 5,493,634 to Bonk et al. and U.S. Pat. No. 5,226,112 to Mensing et al., the disclosures of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co.

1990

Figure 4:
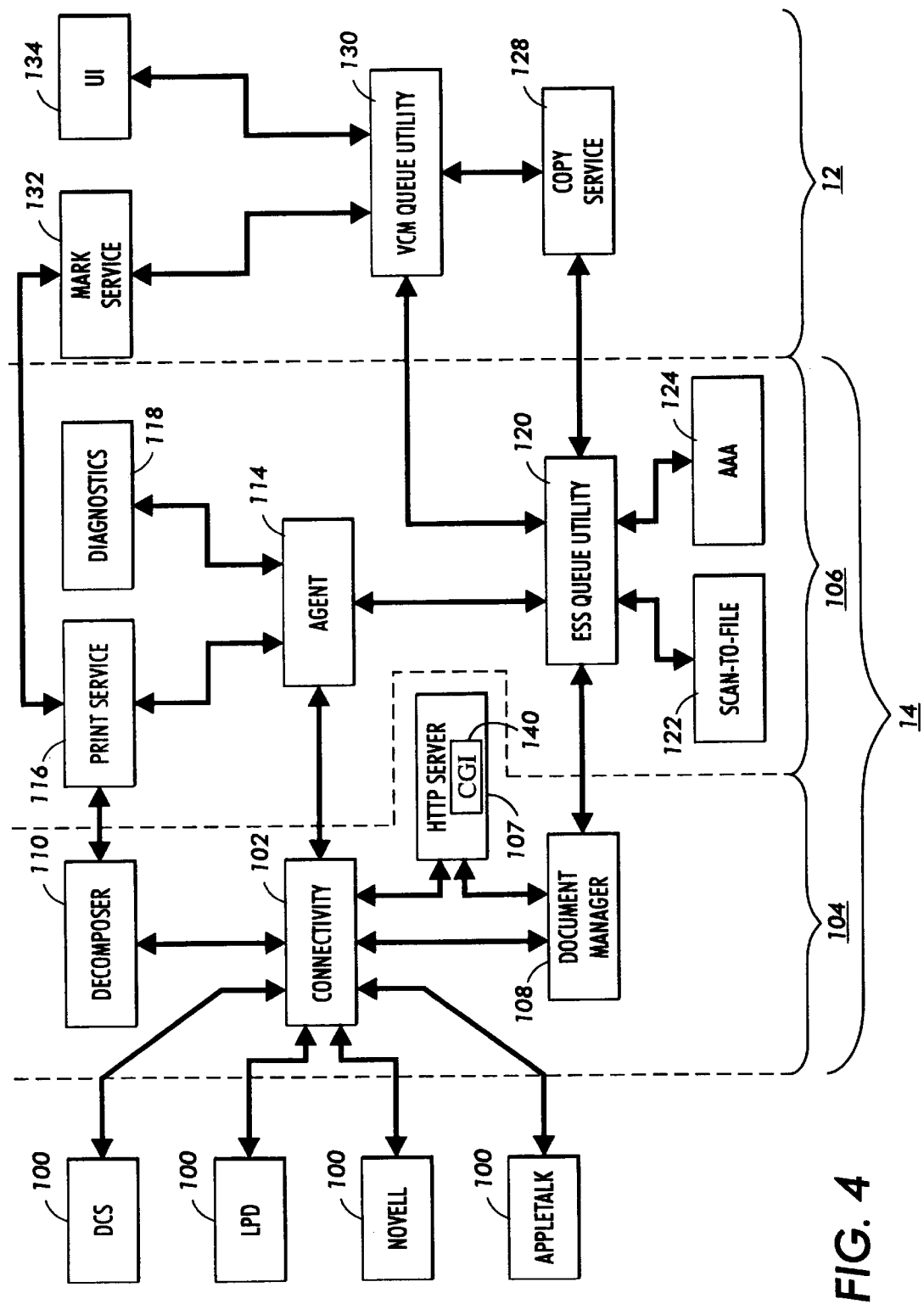
FIG. 4 is a block diagram showing the network controller of FIG. 3 in greater detail.

Referring to FIG. 4, a block diagram which further elaborates on the network controller schematic of FIG. 3 is shown. In the illustrated embodiment of FIG. 4, the clients 100 (each client, in FIG. 3, being shown with a workstation 82 and an emitter 84) are configured with a variety of protocols, such as LPD (a protocol for UNIX), Novell network protocol, AppleTalk and DCS (a protocol for Xerox digital copiers known as the "Document Centre Systems"). Additionally, each of the clients is preferably provided with "browsing" capability which allows for communication with, for example, an HTTP server for access to, among other locations, the World Wide Web. In one example, a given client employs a browser from either Netscape (2.01 or higher) or Microsoft (e.g. "nashville" (a trademark of Microsoft)). The clients communicate with the network server or electronic subsystem ("ESS") 14 by way of Connectivity Services (CS) 102. As shown in FIG. 4, the ESS comprises two parts, namely a Microkernal 104 (more particularly, a partial abstract model of a Microkernal mapped into a model based on DPA ISO 10175/POSIX IEEE 1003.7) and an application specific subsystem 106.

In general, a network or point-to-point print submission originates at the Protocol Service level of the (CS) subsystem. Each Protocol Service listens on a well-known socket for a connection indication. When a Protocol Service receives the connection indication it submits a job request to the Connectivity Core. The Connectivity Core will translate this request into a DPA-compatible format and forward it to a DM subsystem 108. When the job submission is granted, the Protocol Service can submit one or more documents. Document submission is achieved by sending a document request and an I/O descriptor to the Connectivity Core. This will also be translated and forwarded to the DM subsystem.

After the document has been accepted, the Protocol Service starts to receive data from the underlying protocol stack and writes it into the I/O descriptor. This data will read on the other side of the I/O descriptor by a consumer or will be spooled somewhere in the system. When the remote client indicates that there is no more data, the I/O descriptor is closed signaling the end of this specific document. After all documents have been received, a job termination request is sent from the Protocol Service to the Connectivity Core, which then forwards it to the DM. Eventually, this request will be completed by the system, and the Protocol Service will release all resources associated with the job.

Queries normally directed from a client (FIG. 4) to the printing machine 12 are, in one embodiment, processed by use of an HTTP server 107 operating in conjunction with the DM subsystem 108. In the preferred embodiment, the structure and functionality of the HTTP server resides in a proxy server 107A (FIG. 5), the details of which proxy server are discussed in further detail below. It will be appreciated by those skilled in the art that while the illustrated embodiments of FIGS. 4 and 5 include an HTTP server, embodiments employing other server types is contemplated. That is, either server 107 or 107A could assume the form of any server that facilitates browsing on a network (as the term "browsing" is contemplated in the art) between clients and document processing devices without altering the purpose for which the preferred embodiment is intended.

The Microkernel has a Document Management (DM) subsystem that performs most of the DPA/POSIX Server functionality. The DM subsystem validates user requests, queues requests, spools document data, schedules the job for the device, and collects and maintains status information. The DM subsystem extends the DPA/POSIX Server in some aspects, since it can be configured to handle scan jobs (for filing or faxing) and copying jobs. DM provides for document sniffing, spooling, and scheduling services. Service providers, such as Document Processing 110 can register their services with DM.

Document Processing (DP), which includes the Image Frame Store (IFS) and the instantiation of at least one producer, is provided with the Microkernel. DP processes documents into images (full frame buffers or raster-scan bands, depending on the configuration of the Microkernel). The Image Frame Store assigns producers to consumers.

Essentially, the Microkernel 104 can be thought of as a generic ESS while the subsystem 106 can be thought of as an application specific ESS. That is, the Microkernel 104 contains the fundamental building blocks of a print server, while the subsystem 106 contains all of the software components necessary to, in conjunction with the Microkernel 104, provide the VCM 16 with a desired level of operability. More particularly, an Agent, which filters out all commands/requests emanating from the Microkernel 104, is designated with the numeral 114. Basically, the Agent serves as a "hook" into the generic ESS to facilitate the handling of all remote requests. The Agent works in conjunction with other services, such as Print Services 116 and Diagnostics 118, to support the operation of the VCM.

The Agent 114 also communicates with an ESS Query Utility 120 to maintain, among other things, a composite queue, which composite queue is the basis of copending U.S. patent application Ser. No. 08/786,466 filed Jan. 21, 1997. While the functions of the Agent and the ESS Query Utility could be combined, they are shown as separate here in a modularized model. The ESS Query Utility also communicates with a Scan-to-File process 122, which process facilitates the filing of previously scanned documents to the network, as well as an Accounting/Authorization/Authentication service ("AAA") 124. The AAA is used, among other things to authorize the performance of certain acts sought to be performed by a remote client. In one example, the AAA is implemented with software of the type found in Xerox' DocuSP 1.0 print server. As will appear, the AAA facilitates the preferred embodiment in that it prevents the undesirable tampering of one or more queued jobs by unauthorized system users. Additionally, as will appear, ESS Query Utility 120 can be used to obtain a host of information other than queue information. For example, the Utility 120 can be employed to obtain both machine configuration information (such as machine settings) as well as status information relating to subsystems/processes other than the queue(s).

Referring to the printing machine 12 aspect of FIG. 4, a Copy Service 128 communicates with the ESS Query Utility 120 and a VCM Queue Utility 130. The Copy Service, which resides, in one example, on the controller 44 (FIG. 6) performs a function, on the copy side, comparable to the DM 108. Among other things, the Copy Service, supervises the development of copy and Fax jobs as well as the management of the VCM Queue. The VCM Queue Utility communicates with and gathers queue related data from a Mark Service 132 and a suitable User Interface 134. While the functions of the User Interface and the VCM Queue Utility could be combined, they are shown as separate here in a modularized model.

The Mark Service is associated with the printer 20 (FIGS. 2 and 3) and a VCM Queue is associated with the User Interface, as on, for example, the Xerox Document Centre 35 digital copier. As will be appreciated by those skilled in the art, both of the Mark Service and the User Interface are key components in developing and maintaining the VCM Queue. For example, the complexion of the VCM Queue is constantly being altered as a result of activity in the Mark Service, while a significant amount of control is asserted on the VCM Queue as a function of communication with the User Interface.

Referring still to FIG. 4, the HTTP server 107 further includes a common gateway interface ("CGI") designated with the numeral 140. As discussed above, the CGI, through use of suitable software, permits output responsive to user provided parameters, to be communicated to the client 100. More particularly, in practice a client user develops a query (including a set of parameters) which requests an output from a remote network system, such as the printing system 12. In one example, a request may be made with respect to information regarding the order of jobs in a queue or the current settings of the printing system. As will be appreciated by those skilled in the art, a query may be directed toward a wide range of information associated with the printing system and the remote network system being queried could include a system other than a printing system—for instance, the remote network system could include a stand-alone scanning device.

Figure 5:
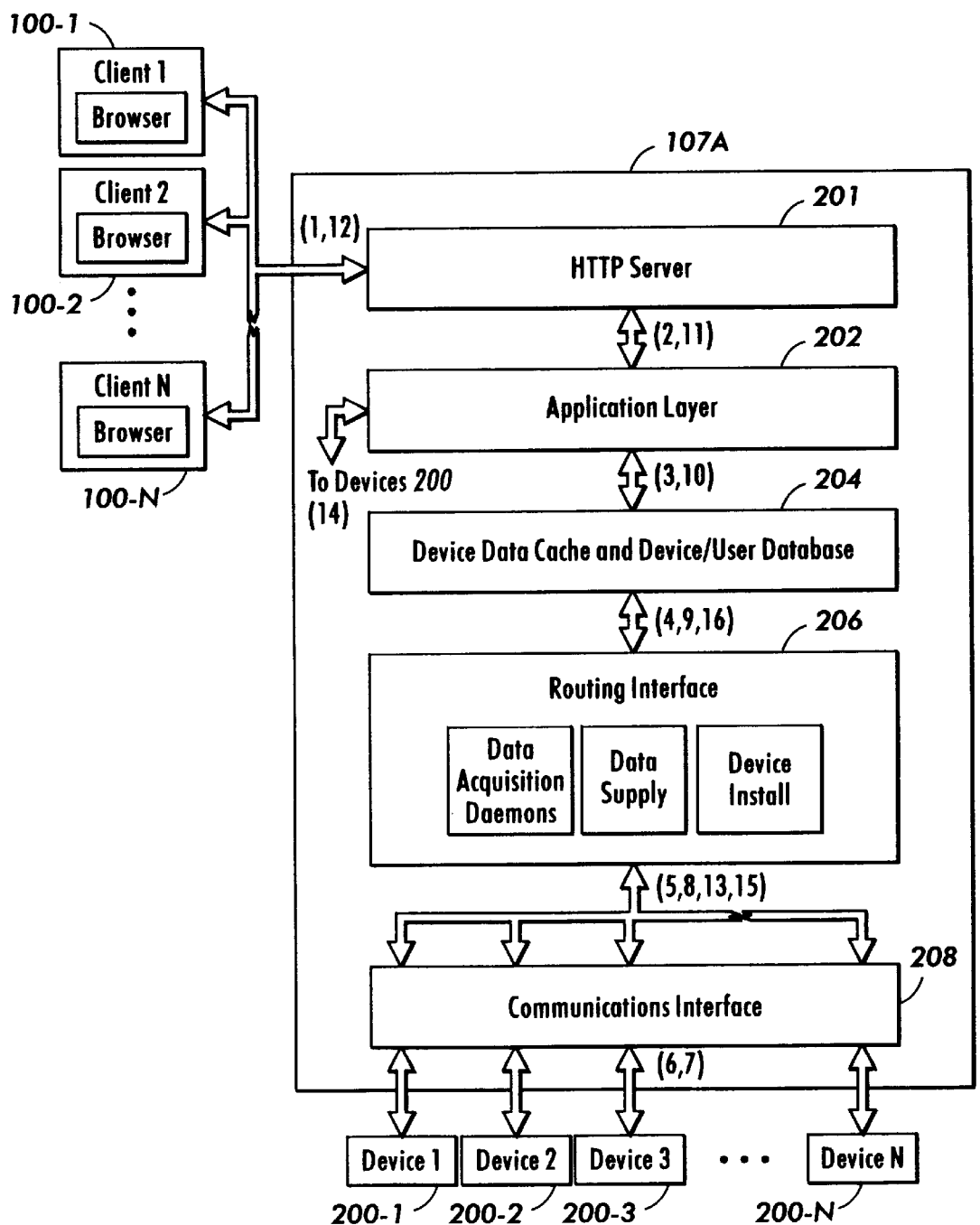
FIG. 5 is a block diagram in which a plurality of clients are communicatively coupled with a plurality of document processing devices (e.g. printers) by way of an HTTP proxy server.

Referring to FIG. 5, the proxy server, which communicatively couples the clients 100 with document processing devices 200-1 (e.g. printing system 12), 200-2, . . . 200-N, includes the following primary components:

HTTP Server 201;
Application Layer 202;
Device Data Cache & Device/User Database 204;
Routing Interface 206; and
Communications Interface 208.

In an exemplary implementation, the HTTP server 201 includes Microsoft's Internet Information Server ("Internet Information Server" ("IIS") is a trademark used by Microsoft in conjuction with web services), while the application layer 202 includes Microsoft's Internet Server applications ("Internet Server Applications" ("ISAs") is a trademark used by Microsoft in conjuction with web services), and filters (e.g. printing handlers, request for information handlers, and data update handlers). An ISA is a Dynamic Linked Library ("DLL") that gets loaded into the IIS's address space in response to a client request. The operation that takes place in response to the request happens in the ISA.

In the exemplary implementation, the device data cache & device/user database 204 (referred to below simply as "database") stores all relevant information that the proxy server has acquired from the devices 200. The stored information includes, among other things:

a list of the devices 200,
a current job queue for each device,
each device's current job status,
the current site settable for each device,
the driver(s) for each device,
references to appropriate strings and bitmaps to be displayed at the client for each device.

The routing interface 206, which preferably comprises a suitable application programmable interface, includes, in one example, three subsystems, namely a data supply application, a data acquisition daemon, and a device installation tool. Preferably, the data supply application (1) makes changes in site settable values in a particular device, and (2) issues job management commands to a particular device. Additionally, data acquisition daemons act as applications that initialize the communications interface 208 and gather, for instance, device, job status, and site settable information from the communications interface 208 about each registered device. In turn, the daemons populate the database with such information. Finally, the device installation tool is, as explained in further detail below, responsible for adding or deleting devices in response to client request.

The communications interface is a set of software programs intended to provide primary connectivity between the clients and the devices. In other words, a key objective of the communications interface is to provide communications between a document processing device and the proxy server's database. In practice, the communications interface acts as a liaison between the Data Acquisition Daemons and the supported devices on the customer's network. It knows how to gather and report various device status, job status, and site settable data via C++ objects and their member functions. In one instance, the communications interface includes a software module to control the communication between the database and a device type. Accordingly, a given module may be adapted to serve a single device or a whole family of devices.

As should be appreciated, while the concept underlying the disclosed server of FIG. 4 can be used to implement the communications interface of FIG. 5, another mode of the communications interface resides in the Document Centre System 35, a printing system provided by Xerox Corporation ("Document Centre System") is a trademark of Xerox. The following is an overview of the communications interface components, which includes information regarding middleware layer components, network abstraction layer components, infrastructure layer components and other protocols:

Middleware Layer Components

This layer implements a basic abstraction of a physical network, and provides an object representation of all supported network entities, including a network neighborhood, queues, file servers and printers and/or multi-function devices. Additionally, this layer, which includes the below-described components, translates the abstraction into a number of different network operating systems and protocols, including Novell, SNMP, and RPC.

Logging Objects: These objects provide the basic mechanism for writing a descriptive log as actions occur on the client services software. The logged information is extremely useful in problem diagnosis.

Common MIB Service: This service supports enterprise coherence, and provides set/get functionality, while dealing with information defined in a common MIB—note that this includes Simple Network Management Protocol (SNMP) events and alerts.

RFC1759 Support: RFC1759 Support objects encapsulate knowledge of an industry-standard printer MIB.

SNMP Service: The SNMP Service is a collection of objects supporting SNMP connectivity. This service may be divided into 3 basic parts—(Part 1) SNMP Get/Set Operations Support, (Part 2) SNMP Event Listening Support, and (Part 3) SNMP MIB-Specific Support. The SNMP Service is built on the infrastructure portions of the type described below. It provides a higher level (more simple and customized) C++ interface to, among other services, the devices 200.

Accounting Extension: The middleware layer is extended by various "vertical slices" of functionality. The accounting "vertical slice" supports accounting functionality to selected devices. Note that this extension is extremely successful in building upon (re-using) middleware objects.

Scan Extension: This "vertical slice" extension to the middleware supports scan-to-[network] file functionality (see now-allowed patent application Ser. No. 08/489,350 to Kovnat et al., the disclosure of which is incorporated herein by reference) for selected ones of the devices. In practice, scan extensions are implemented as a separate dynamic link library and as such need only be loaded by applications requiring scan-to-file functionality.

Network Abstraction Layer Objects

This service, which includes the below-described components, provides an interface to a network abstraction library. It is implemented as a set of C++ objects.

Print Provider: This abstracts details of print job submission in, for example, the Windows95 and WindowsNT client operating system environments ("Windows95" and "WindowsNT" are trademarks or Microsoft Corp.).

Device Discovery:

Methods of device discovery vary for different network operating systems. Devices on a Novell network broadcast a Service Advertising Protocol (SAP) packet every 60 seconds. For selected Xerox devices, such as the Document Centre System 35 and the Document Centre System 20 ("Document Centre System" is a trademark used with printing system provided by Xerox Corporation), the SAP packet includes the device address and device print server (PServer) name. These devices may be queried via SNMP to obtain a product code corresponding to the device type. In a Microsoft network, an SNMP broadcast will be sent to discover devices. Each response to the broadcast will include the device network address and product code information. An additional SNMP call will be made to get the device hostname. Other networks may use an SNMP broadcast.

Infrastructure Layer Components

This layer provides low level network connectivity for one or more families of document processing platforms. It typically includes:

1) a set of utilities for handling remote events, through use of an SNMP listener;

2) an SNMP management module;

3) an interface for providing job control functionality;

4) a transport layer;

5) a library including a set of utilities dealing with network operating system capabilities;

6) a library accommodating for functionality in a Novell network environment;

7) run-time libraries; and 8) low level interaction with RFC1759.

Other Protocol Support

Protocols used to facilitate operability of the above-mentioned components include, among others, TCP/IP, Netware ("Netware" is a trademark used by Novell, Inc. in conjunction with network operating systems), and LAN Manager.

The following are selected data flow scenarios contemplated for the system of FIG. 5 (numbers in parentheses are keyed to this drawing):

In general:

The database acts as a cache for all relevant device information.

The clients receive information through/from the database.

The database gets populated by the data supply and acquisition daemons via the communications interface, and by the device installation tool.

Client Requests for Information from server For Device Status, Job Status, and Current Site Settable Values:

In each case, the client requests a URL (web page) for a particular device of a particular type (1).

The HTTP server calls the appropriate function in Application Layer (2).

That function requests a home page (for the type of device) and its associated data (for the particular device) from the database (3) which returns the data (10).

The application layer retrieves the appropriate web page, plugs in the data and returns the page to the client (11, 12).

The ISA retrieves the appropriate web page, plugs in the data and returns the page to the client (11, 12).

Client Upload of Information to Proxy Server (Device/Job Management Commands)

For Altered Site Settable Values and Job Management Command:

In each case, the client sends the data and its purpose to the HTTP server (1).

The HTTP server calls the appropriate function in the application layer (2).

The function of the application layer changes the appropriate cell(s) in the database (3).

Attempting to change a value in the database triggers a data supply function call (4) that changes the values on the appropriate device via the communications interface (5, 6).

After the data is updated on the device, the database completes the change in data.

Proxy Requests for Information from Device

For Device Status Changes, Job Status Changes, and Current Site Settable Values, Device Addition and Removal The data acquisition daemon registers a device with the communications interface (13). (A new device appears as a System Administrator adds a print queue on the proxy server.)

The Middleware proceeds to acquire current device status/job status for that device (7) and return it to the data acquisition daemon (8).

The data acquisition daemon stores the updated data in the database (9).

When the data in the database is about to change, the database invokes functions in the application layer which sends the data updates to appropriate clients.

Device Installation

The user defines a new device by specifying an arbitrary name, a device IP address, and a device type. An LPR port and queue associated with that device is automatically set up on the HTTP server.

The new device is then listed in the data base (16) for display at the clients.

The new device is also registered with the communications interface (15) for access to device data.

Figure 6A:
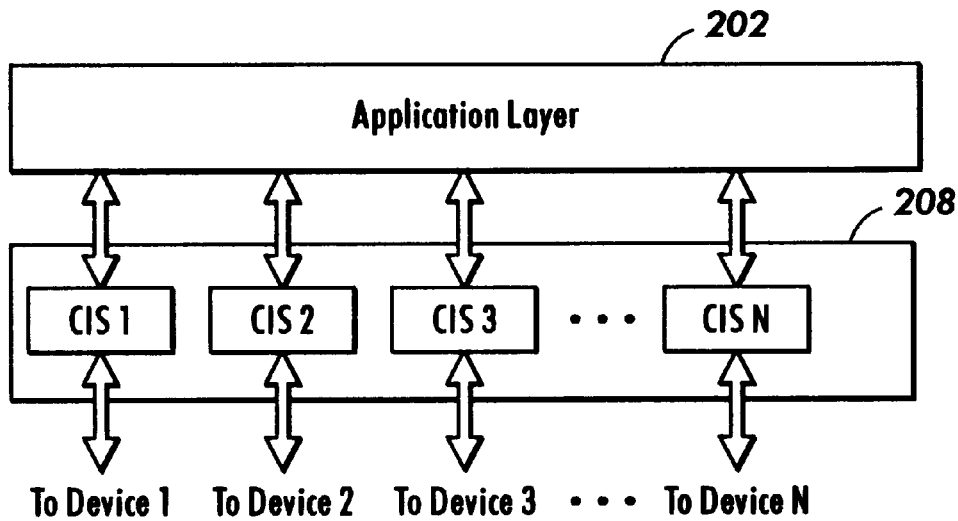
FIG. 6A is a block diagram showing a nonpreferred relationship between the routing and communications interfaces of FIG. 5.
Figure 6B:
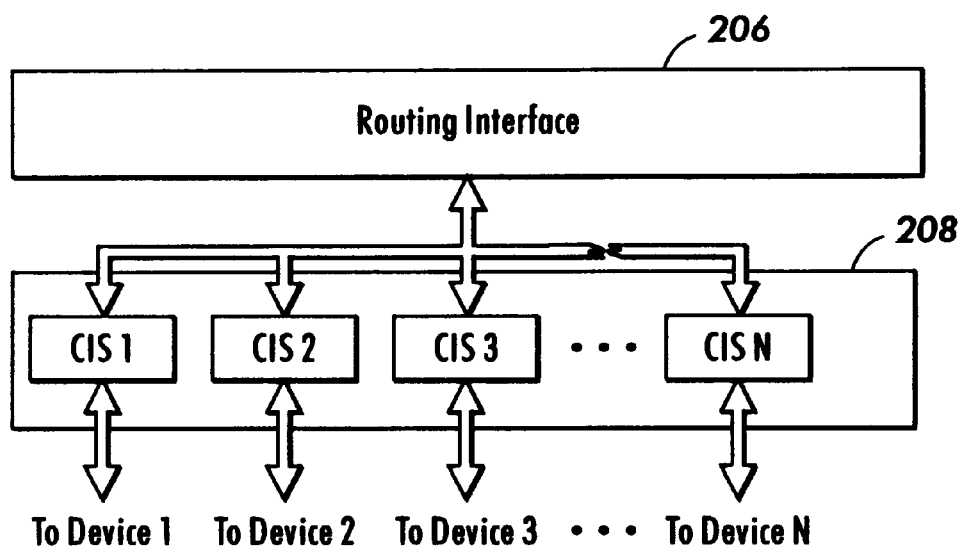
FIG. 6B is a block diagram showing a preferred relationship between the routing and communications interfaces of FIG. 5.

Referring to FIGS. 6A and 6B, an advantageous aspect of the preferred embodiment is discussed. In a less preferred approach, as shown in FIG. 6A, the application layer is responsible for making detailed requests, with respect to, for example, obtaining device related information. That is, for those situations in which the client desires information regarding the machine settings of one of the devices 200 (FIG. 5), the application, in the illustrated embodiment of FIG. 6A, provides the communications interface 208 with a detailed list regarding the machine value settings that it seeks. In turn, the detailed list is communicated to a suitable module ("CIS_") in the communications interface, the module causing queries or commands of the list to be communicated to a corresponding device at which client requested values are provided. With respect to the module, each device in the disclosed system is represented as an instance of a C++ class, where each class represents a type of device. That is, one class corresponds with one type of device (e.g. a printing system), another class corresponds with another type of device (e.g. a stand-alone image capture device), and so on. As should be appreciated, this less preferred approach requires one writing code for the application layer to have relatively significant knowledge regarding the various machine settings associated with the particular device for which information is sought.

By contrast, in the preferred approach of FIG. 6B, the application receives a request from a client and translates that request into a function call with an argument. In practice, as will appear from the discussion below, the information call permits the routing interface 206 to communicate to the communications interface, in a shorthand manner, what information the client desires. More particularly, the substance of the function and its argument is made available to an appropriate module in the communications interface and that module decides which values are to be provided to or which actions are to be taken with respect to a particular device. As should be appreciated, this greatly reduces the amount of commands to be provided by the application layer.

Using the underlying structure/function of the communications layer, the interface to each device looks the same to the application layer, regardless of which type of device it is and regardless of the underlying structure/function required to access the device. An exemplary list of function calls used by the proxy server is provided below:

| Job Management Commands: | Hold Job(DeviceName, JobID) |
|---|---|
|  | Promote Job(DeviceName, JobID) |
|  | Cancel Job(DeviceName, JobID) |
|  | Release Job(DeviceName, JobID) |
| Status Commands: |  |
| Job Status | GetJobStatus(DeviceName) |
| Device Status | GetDeviceStatus(DeviceName) |
| Configuration Commands: |  |
| Configuration Display | Get Device Settings(DeviceName) |
| Configuration Change | Set Device Settings(DeviceName, VariablesToSet) |
| Installation Commands: |  |
| Device Addition | AddDevice(DeviceName, IP Address, DeviceType) |
| Device Deletion | DeleteDevice(DeviceName) |

Figure 7:
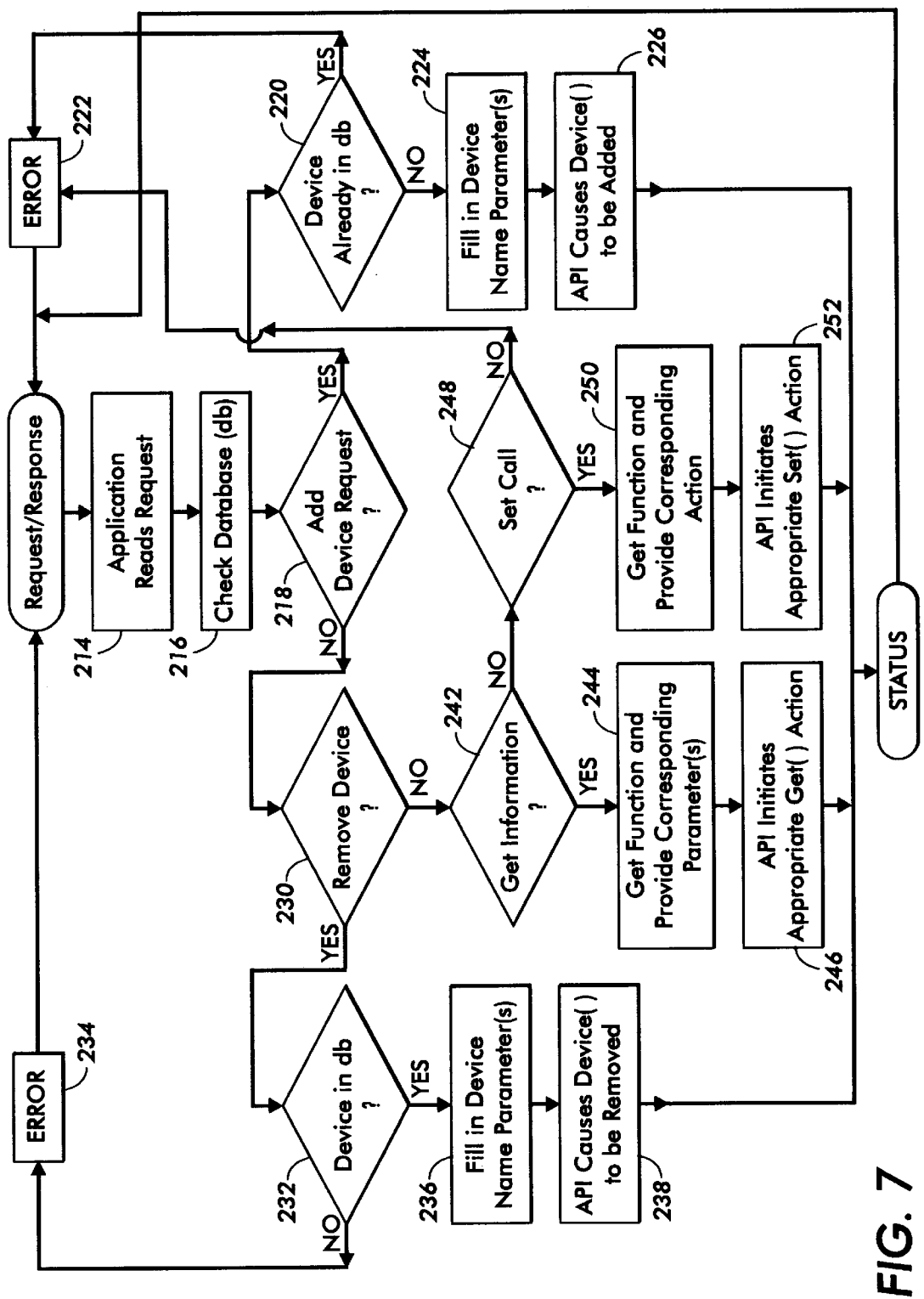
FIG. 7 is a flow diagram showing how various function calls are employed to perform operations relative to one or more document processing devices.

Referring to FIG. 7, an overview of the manner in which the above calls or commands are used is provided. Initially, a request is made from a client 100 (FIG. 5) to the proxy server 107A and, at step 214, the request is read at the application layer 202. Pursuant to making a function call, the application layer checks the database 204 (step 216) to determine what information about the devices exist and when that information populated the database. Preferably, the information in the database is "date stamped" so that, under certain circumstances, a client request for information can be addressed without invoking the communications interface 208 with respect to such request. For example, in one contemplated situation, relatively current machine setting information is provided from the database to the client without invoking the communications interface in direct response to such request. For ease of discussion, it will be assumed below that information or operations with respect to devices 200 are performed by invoking the communications interface with the routing interface 206 in direct response to a client's request.

At step 218, a determination as to whether the request seeks to have a device installed, i.e. added, is made. Assuming an addition is requested, a check is performed at step 220 to determine if the device to be added is already listed in the database. If the device is listed in the database, i.e. the device has already been installed, then an error message issues (i.e. the error message is reported back to the client seeking installment), at step 222; otherwise, an Add function call is, at step 224, filled out with the name of the device to be added. In turn, the routing interface 206 (preferably an API) causes the communications interface 208 to add the new device (step 226) in accordance with the procedure described below.

Provided a request for the addition of a new device has not been made, a determination is made, at step 230, as to whether a device is to be removed. Assuming a device is to be removed or deleted, a determination, at step 232, as to whether the device is listed in the database 204 is made. If the device to be removed is not in the database, then an error message issues (i.e. the error message is reported back to the client seeking installment), at step 234; otherwise, a Remove function call is, at step 236, filled out with the name of the device to be removed. In turn, the routing interface or API 206 causes the communications interface 208 to remove the designated device (step 238) in accordance with the procedure described below.

Assuming that an installation is not required, a determination is made, at step 242, to determine whether a Get operation is requested. In order to provide a Get operation, a Get function is provided by the application layer (step 244) and its corresponding argument is filled out in accordance with the procedure below. In turn, the API 206 causes the communications interface, by way of step 246, to implement the requested Get operation. On the other hand, if a Set operation is requested (see step 248), then a Set function is provided by the application layer (step 250) and its corresponding argument is filled out in accordance with the procedure below. In turn, the API 206 causes the communications interface, by way of step 252, to implement the requested Set operation. In any event the status of an action initiated via the implementation of FIG. 7 is reported back to the client requesting the action via the "STATUS" block.

The above-described commands/calls are implemented with selected components of the server 107A, with the components being referred to below as the "interface". A detailed discussion of the commands/function calls employed with the above described interface is provided below:

Job Management Commands enable a user to issue commands to jobs the interface knows about in the Window NT queue or on the destination device's hard disk if any. To the calling program, it doesn't make any difference whether the job is in a server queue or at the device. The call is the same. In the following four commands:

HoldJob(LPCTSTR strDeviceName, SYSTEMTIME jobID)
PromoteJob(LPCTSTR strDeviceName, SYSTEMTIME jobID)
CancelJob(LPCTSTR strDeviceName, SYSTEMTIME jobID)
ReleaseJob(LPCTSTR strDeviceName, SYSTEMTIME jobID)

LPCTSTR is a Microsoft designation for a pointer to a string of characters. SYSTEMTIME is a Microsoft structure (serving as a "time stamp") which contains elements for Year, Month, Day, Day of week, Hour, Minute, Second, and Millisecond.

Each of these functions takes as an argument including the name of the device or queue and a job ID made up of the year/month/date/hour/minute/second of the job submission time. Standard job IDs are not employed because the ID used on the NT queue are different that the IDs used on the devices with hard disks.

Attempts to perform the indicated operation. HoldJob( ) stops a job in its current position in the queue. ResumeJob( ) starts a held job.

Canceljob( ) deletes a job from the queue. PromoteJob( ) moves a job to the top of the queue.

These functions return an integer describing the result of the command.

The Systemtime structure is used as an identifier because the normal job identifier changes when the job moves from the NT server to the device making it useless as a unique identifier; however, the job submission time never changes. Accordingly, the Systemtime structure identifier can be used as the unique identifier of a job regardless of its location on the network.

Status Commands enable the user to get current status about a particular device or about jobs destined for a particular device:

GetDeviceStatus(LPCTSTR deviceName)

This function calls various interfaces (depending on the type of device) to get general status about the device named in the argument, as well as specific status about the device's various subsystems like the paper trays, the scanning system, the finishing subsystem, etc.

Each type of device is represented by a C++ class. Each class contains a data structure that represents all the possible device status values for that type of device. GetDevice Status( ) fills this structure with device status data and returns it to the caller.

GetJobStatus (LPCTSTR DeviceName)

This function calls various interfaces (depending on the type of device) to get status about jobs destined for the device named in the argument.

Each type of device is represented by a C++ class. Each class contains a data structure that represents the jobs destined for the device's print engine both in a corresponding queue and on the device's hard disk if the device has a hard disk. GetJobStatus( ) fills this structure with information about each job in both queues (or one queue if no hard disk is present on the destination device) and returns it to the caller.

Configuration Commands are used to get and set various values in the device's non-volatile memory that define the current device's configuration:

GetDeviceSettings(LPCTSTR DeviceName)

This function calls various interfaces (depending on the type of device) to get configuration data from the device named in the argument.

Each type of device is represented by a C++ class. Each class contains a data structure that represents the available configuration for that type of device. GetDeviceSettings( ) fills this structure with information about the instance of the device represented by the DeviceName argument and returns it to the caller.

SetDeviceSettings(LPCTSTR DeviceName, DeviceConfigurationStructure* VariablesToSet)

This function calls various interfaces (depending on the type of device) to set configuration data on the device named in the argument. The particular data to be set is specified in the VariablesToSet argument.

The VariablesToSet argument is a pointer to a structure. The structure is identical to the structure filled by GetDeviceSettings( ) described above. The caller fills the structure with new data for the items that should be changed. The remaining items are left blank.

Each type of device is represented by a C++ class. Each individual device is represented by an instance of the appropriate class.

GetDeviceSettings( ) sets the values on the device that have been filled in with a data structure by the caller. If any one of the individual sets fail, the failed item(s) of the data structure is converted to an error code that the caller can read. If all the sets fail, then the device name in the structure becomes an error code. The function itself returns a Boolean value where TRUE (1) means success and FALSE (0) means at least one of the sets has failed.

Discovery or Installation Commands

AddDevice (LPCTSTR DeviceName, LPCTSTR IPAddress, LPCTSTR DeviceType)

For each device to be added, an LPR Port and a LPR queue associated with the device are set up on the NT Server. The program started by the AddDevice request adds the LPR Port and associated LPR queue for the device being added and loads an appropriate driver for the device.

DeleteDevice (LPCTSTR DeviceName)

The NT Server removes (1) an LPR Port and Queue, both of which correspond to the device being deleted, (2) any registry entries associated with the device, and (3) an appropriate entry from the file in the NT Server, the entry corresponding with the device.

Numerous features of the disclosed embodiments will be appreciated by those skilled in the art:

First, a proxy server which optimizes code development is provided. More particularly, by disposing an application programming interface (API) downstream of an application layer and upstream of a communications interface, the burden of developing code at the application layer is minimized without substantially increasing the burden of code development at the communications layer. Essentially, through judicious use of the API, code development is distributed between the application layer and the communications interface in an intelligent manner.

It follows from the use of the API that requests or "calls" from the application layer to the communications layer are made exceedingly simple. Preferably, to obtain information from or perform an operation with respect to a given device, the application layer need only provide the API with a function call having a suitable argument. In turn, the API routes the function call to a subsystem in the communications interface for appropriate processing.

Second, the proxy server is usable, in an Internet context, with all sorts of document processing devices, none of which devices need be adapted specially for Internet use. Accordingly, all of the devices are usable with the server, notwithstanding their possession of a special adapter card and/or an HTTP server. Thus, the proxy server is capable of easily accommodating devices from different manufacturers with quite different designs.

Finally, the proxy server uses a database in a manner that minimizes the amount of time required to obtain device related information requested by one or more clients. In particular, time stamped information is stored periodically in the database by the API and communications interface. If the information is requested by the client and is sufficiently current when the application accesses the database, then the information is provided to the requesting client without any need to invoke the API or communications interface.

What is claimed is:

1. A method of operating a print server in which a client communicates with one of a plurality of digital printers, comprising the steps of:

providing, within the print server, an application layer, the application layer generating a document processing function call in response to a request from the client;

providing, within the print server, a plurality of connectivity modules, each connectivity module being associated with at least one of the plurality of printers, each connectivity module converting a function call and argument from the application layer to a form understandable by a digital printer associated with the connectivity module; and selecting a connectivity module associated with a digital printer desired to be used, and directing a function call from the application layer to a connectivity module associated with the desired printer.

2. The method of claim 1, further comprising the step of providing an HTTP server interposed between the application layer and the client, for communication between the client and the application layer, the application layer converting messages received through the HTTP server to function calls to the connectivity modules.

3. The method of claim 1, further comprising the step of retaining, in a database, information about each of the plurality of digital printers which are accessible through the connectivity modules.

4. The method of claim 3, further comprising the step of time-stamping information about individual digital printers as the information is placed in the database.

5. The method of claim 3, further comprising the step of checking information about a selected digital printer in the database before sending a function call to the connectivity module associated with the selected digital printer.

6. The method of claim 5, the checking step including checking that a digital printer being requested by a client is associated with a connectivity module.

7. The method of claim 5, the checking step including when a client requests that a digital printer is added to a set of digital printers serviced by the print server, checking the database if the requested digital printer is already associated with the print server.

* * * * *